(No Model.)

A. M. KRONE.
SAFETY NUT LOCK.

No. 471,796. Patented Mar. 29, 1892.

Witnesses
Frank Pardon
Clarence E. Walker

Adolph Max Krone  Inventor
By his Attorney
R. M. Kelly

UNITED STATES PATENT OFFICE.

ADOLPH MAX KRONE, OF LOUISVILLE, KENTUCKY.

SAFETY NUT-LOCK.

SPECIFICATION forming part of Letters Patent No. 471,796, dated March 29, 1892.

Application filed May 18, 1891. Serial No. 393,104. (No model.)

*To all whom it may concern:*

Be it known that I, ADOLPH MAX KRONE, a citizen of the United States, residing at Louisville, in the county of Jefferson and State of Kentucky, have invented certain new and useful Improvements in Safety Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to devices for holding or locking nuts so as to prevent them from turning on their bolts and working loose.

My device is applicable to bolts and nuts used for any purpose where the nuts are liable to become loosened from any cause.

My improved safety nut-lock consists of four parts: first, a bolt having a right thread next to shaft to receive the right nut and a left thread next to the end to receive the locking-nut; second, a right nut having grooves on its outer end; third, an elongated locking-nut having grooves on its inner end corresponding to those on the outer end of the right nut, and, fourth, a flat split key adapted to pass through the aperture formed when the grooved ends of the two nuts are brought together.

Figure 1:
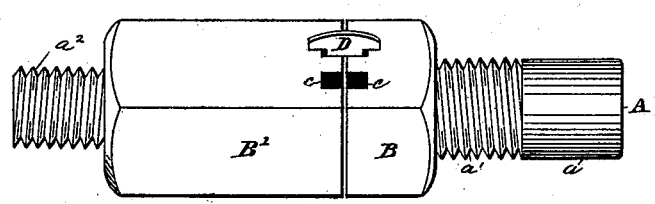
Figure 2:
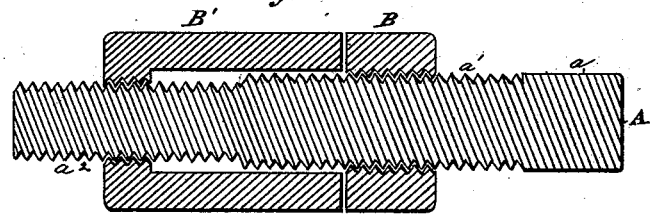
Figure 5:
Figure 3:
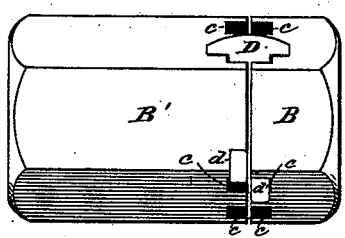
Figure 4:
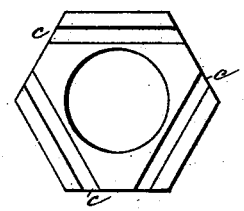

Figure 1 is a perspective view of my nut-lock fastened on its bolt. Fig. 2 is a sectional view of the same. Fig. 3 is a perspective view of the two nuts in juxtaposition, showing the mode of holding them together by pressing down the arms of the split key. Fig. 4 is a plan view of the end of a nut, showing the grooves. Fig. 5 is a view of the split key.

A represents the bolt; $a$, the shaft of the bolt; $a'$, the right thread, and $a^2$ the left thread.

B represents the right nut, and B' the left or locking nut.

$c\,c\,c$ represent the grooves in the ends of the nuts.

D represents the split key, and $d$ and $d'$ its arms.

The diameter of that part of the bolt bearing the left thread $a^2$ is smaller than the part next the shaft that bears the right thread $a'$, so as to enable the right nut B to be slipped easily over the left thread $a^2$, in order to reach the right thread $a'$. The hole in the left nut at its grooved inner end is larger in diameter than the shaft of the bolt and continues of that size until near its outer end, when it is lessened to correspond with the smaller diameter of the bolt toward its end, and provided with a thread adapted to work on the left thread $a^2$ of the bolt, as shown in Fig. 2. The left nut B' is elongated, as shown in the drawings, so that it can follow the right nut when it is screwed down toward the shaft. The grooves $c$ on the ends of the nuts can by using a wrench always be made to correspond, thereby forming an aperture adapted to receive the split key. I prefer to have a number of grooves on the end of each nut corresponding to the number of sides the nut has and to have them parallel to the sides, so that no matter how the bolt may be located it will be easy to find a key-seat; but I may make in each nut only one groove or more, up to the number of sides of the nut.

In operating my device the right nut B is slipped over the left thread $a^2$ till it engages the right thread $a'$, when it is screwed down to the desired point. The left nut B' is then passed over the threaded part of the bolt till its thread engages the thread $a^2$, when it is screwed down to the right nut, the grooves fitted together, the flat split key inserted in the aperture formed by the grooves, and the projecting part of its arm $d$ bent down onto the outside of the nut B' and the projecting part of the arm $d'$ bent down on the right nut B, as shown in Fig. 3.

It will be readily seen that nuts locked on my plan cannot work loose, as the key holds them together, and they cannot turn, as one works on a right and the other on a left thread.

My nut-locking device can be made of any size or any material and used wherever it is desired to keep nuts from working loose.

What I claim is—

A nut-locking device consisting of a bolt having both a right and left thread near its end, the right thread next to the shaft of the bolt and of the same diameter with it, the left thread nearer the end and of smaller diameter than the shaft, a right nut B, adapted to work on the right thread and having grooves c in its outer end, an elongated left nut B', provided near its outer end with a thread adapted to work on the left thread of the bolt and having the hole beyond its thread enlarged to a diameter slightly greater than that of the shaft of the bolt and having grooves on its inner end corresponding to those on the outer end of the right nut B, and a flat split key, all arranged and constructed substantially as set forth, and for the purpose specified.

In testimony whereof I affix my signature in presence of two witnesses.

ADOLPH MAX KRONE.

Witnesses:
H. B. UTLEY,
CHAS. D. SHANK.